INVENTOR.
STONEWALL J. GARDNER,
BY *Jerry L. Mathews*

ATTORNEY.

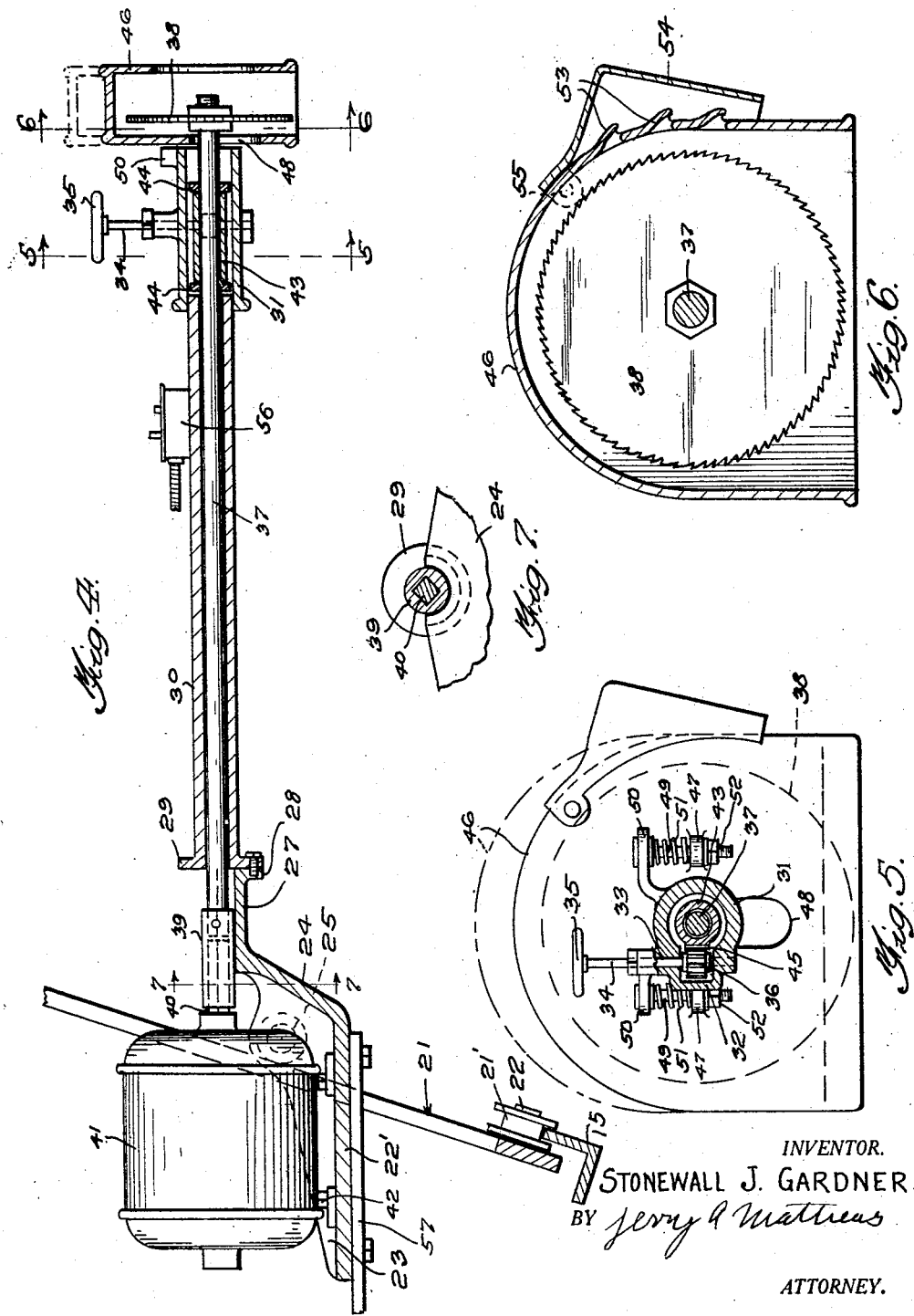

Patented Mar. 24, 1931

1,797,646

UNITED STATES PATENT OFFICE

STONEWALL J. GARDNER, OF NEW ALBANY, INDIANA

LOG-GROOVING SAW

Application filed September 27, 1929. Serial No. 395,639.

My invention relates to improvements in log grooving saw machines.

An important object of the invention is to provide simple and efficient means for sawing a longitudinal groove in a veneer log, after it has been placed in a veneer lathe, and before it has been cut into sheets of veneer.

A further object of the invention is to provide a saw of the above mentioned character, so constructed that grooves may be sawed upon opposite sides of a knot, or imperfection, in the log, so that when the sheets of veneer are cut from the grooved log, such sheets will not embrace the knot or imperfection, as the same will be contained in a narrow strip of waste veneer, between the two grooves.

A further object of the invention is to provide a saw of the above mentioned character so constructed that it may be attached to a veneer lathe in a manner to become a permanent part of the lathe, and will have its direction of travel parallel to the axis of rotation of the log driven by the lathe, without adjustment.

A further object of the invention is to provide means whereby two or more grooves can be sawed longitudinally of the log within a span of approximately two inches, without changing the position of the log with respect to the rotatable members of the lathe, enabling the operator to saw grooves upon opposite sides of a knot or imperfection, without shifting the log with respect to the rotatable members of the lathe.

A further object of the invention is to provide a machine of the above mentioned character so constructed that the rotatable saw element is counter-balanced, and will automatically swing to the upper position out of the way, when released.

A further object of the invention is to provide a machine of the above mentioned character so constructed that the rotatable saw will cut a longitudinal groove in the log, which groove is transversely oblique to the vertical and horizontal, with the result that saw dust will not accumulate within the groove and is automatically thrown from the same by the action of the saw.

A further object of the invention is to provide adjustable means to regulate the depth of the groove, the depth remaining constant for each adjustment.

A further object of the invention is to provide a guard for the rotatable saw which not only regulates the depth of the groove but automatically completely covers the saw element when the saw element is brought out of engagement with the log.

Figure 1:
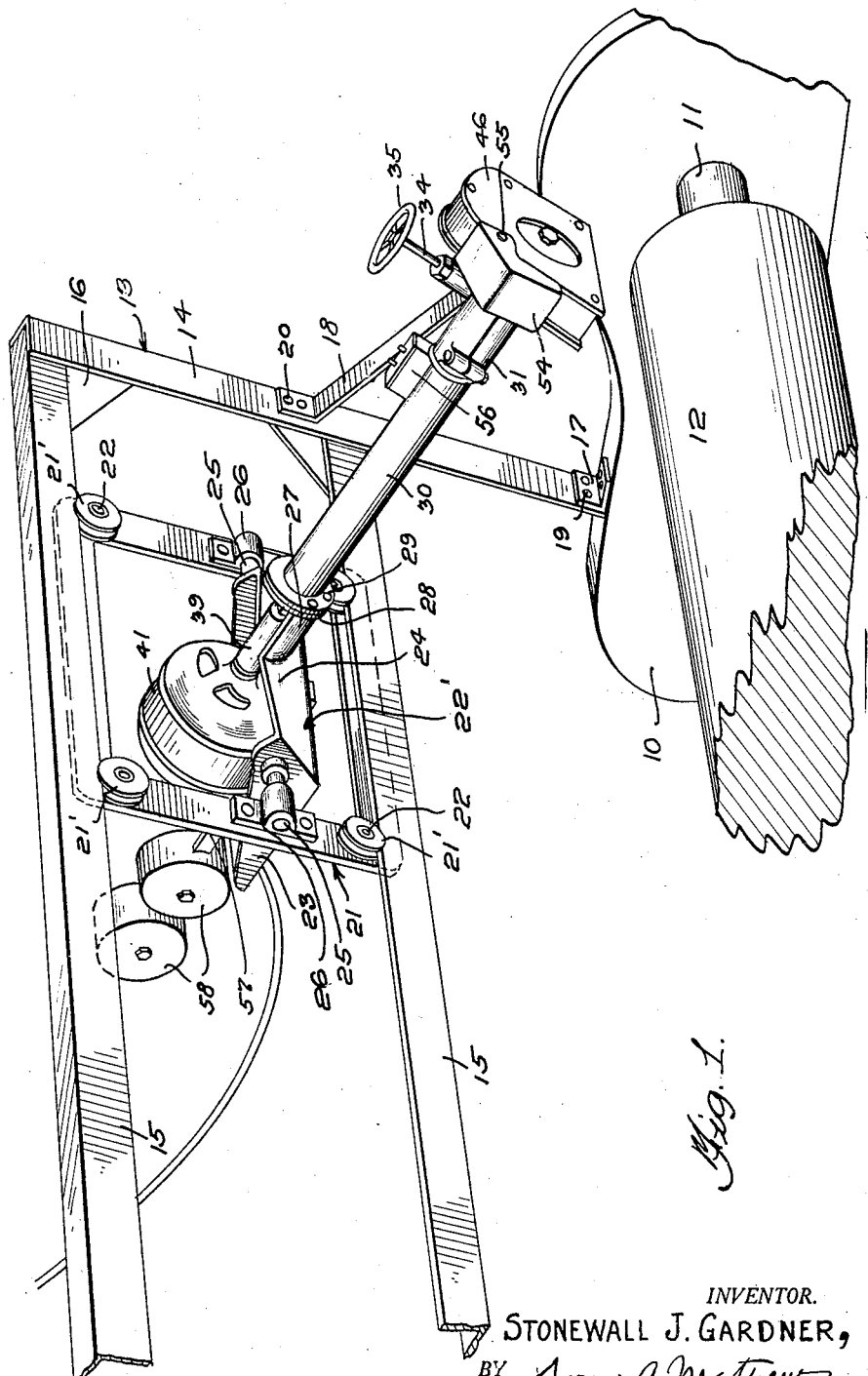
Figure 2:
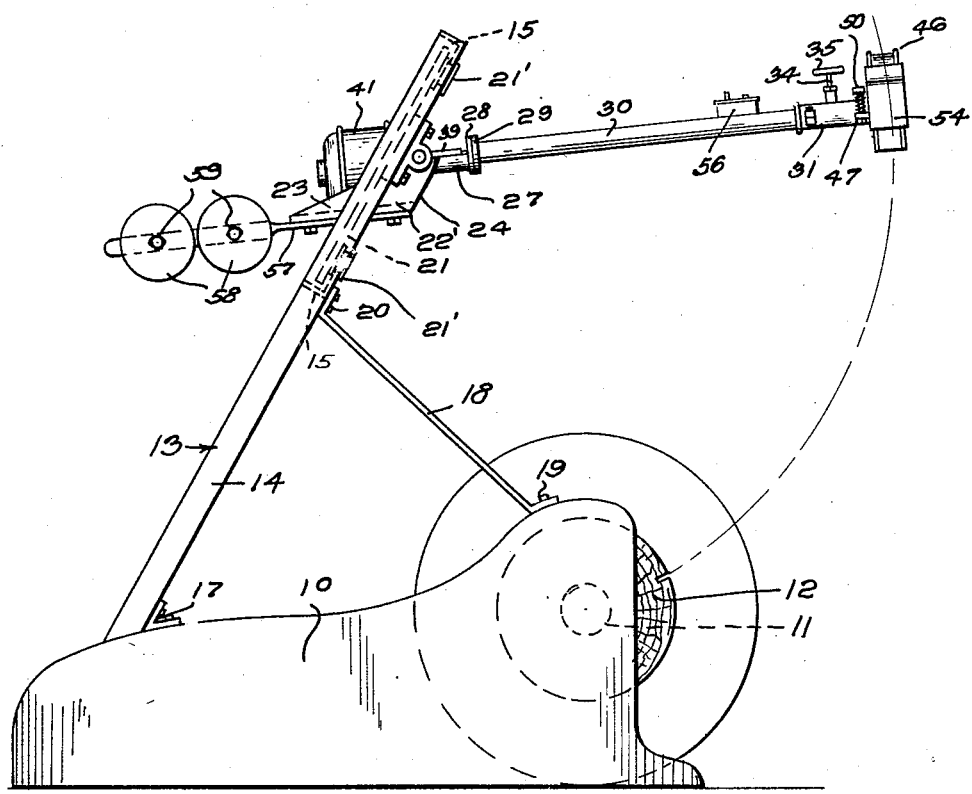
Figure 3:
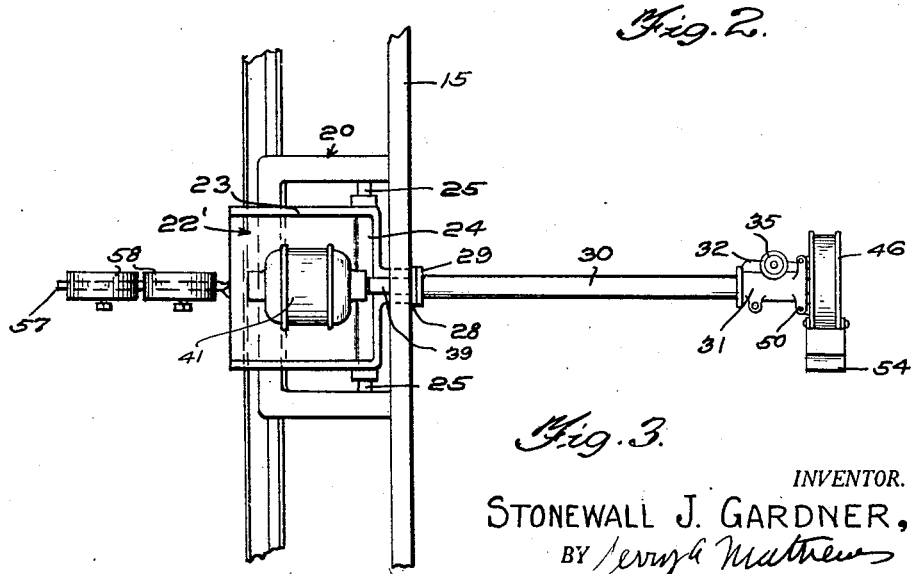

In the accompanying drawings, forming a part of this specification, and in which like numerals are employed to designate like parts throughout the same, Figure 1 is a perspective view of a groove sawing machine embodying my invention, Figure 2 is an end elevation of the same, Figure 3 is a fragmentary plan view of the same, Figure 4 is a side elevation of the vertically swinging unit, parts in section, Figure 5 is a transverse section taken on line 5—5 of Figure 4, Figure 6 is a similar view taken on line 6—6 of Figure 4, Figure 7 is a similar view taken on line 7—7 of Figure 4.

In the drawings, wherein for the purpose of illustration, is shown a preferred embodiment of my invention, the numeral 10 designates the ends of the lathe frame, within which are mounted rotatable members 11, holding a veneer log 12 between the same, to turn it upon its longitudinal axis. The lathe may be of any well known or preferred type.

The groove cutting machine embodies a supporting frame 13, including end uprights or posts 14, formed of angle irons or the like, and which may incline forwardly, while the invention is in no sense restricted to this arrangement. These uprights are connected by horizontal rails 15, formed of angle irons or the like and the connection may be reinforced by plates 16. The lower ends of the uprights 14 are rigidly attached to the end members 10 by angle irons 17, or by any suitable means. The numeral 18 designates diagonally arranged braces, the lower ends of which may be attached to the members 10, by bolts 19 or the like, and their upper ends to the intermediate portions of the uprights 14, by bolts 20 or the like. The rails 15 are positioned upon one side of the axis of rotation of the rotatable elements of the lathe and the log and are parallel to such axis of rotation.

The numeral 21 designates a preferably rectangular open carriage or traveling frame, provided with grooved wheels 21', secured thereto by shafts 22. These grooved wheels travel upon the rails 15, as shown.

Disposed within the open carriage or frame 21 is a bed 22', having upstanding sides 23 and an upstanding forward end 24. The sides 23 are equipped with trunnions 25, preferably rigidly attached thereto, and these trunnions are pivoted within bearings 26, rigidly attached to the sides of the open carriage 21.

The end 24 of the bed is provided with an extension 27, preferably formed integral therewith. This extension is preferably U-shaped in cross section. This extension projects forwardly beyond the end 24 and is equipped with a flange 28, bolted or otherwise rigidly attached to a flange 29, formed upon the rear end of a tubular housing 30. A collar 31 is clamped or otherwise rigidly mounted upon the forward end of the housing 30 and this collar, Figure 5, is provided with a lateral extension 32, having a vertical opening 33, formed in its top for receiving a shaft 34, equipped with a hand wheel 35. The shaft 34 carries a pinion 36, arranged within the extension 32, for a purpose to be described.

Rotatably and longitudinally slidably mounted within the tubular housing 30, is a drive shaft 37, which extends through and beyond the collar 31 and has a rotatable saw element 38, suitably clamped to its free end, for rotation therewith. At its rear end, a tubular coupling 39 is clamped to the drive shaft 37, and the bore of this tubular coupling is preferably square in cross section, to slidably receive the outer end of the armature shaft 40 of a motor 41. This extension of the armature shaft is also square in cross section whereby the coupling 39 is free to move longitudinally upon the shaft 40, to turn with it. The motor is rigidly mounted upon the bed 22', as shown at 42, Figure 4, and the weight of the motor is disposed rearwardly of the trunnions 25.

As clearly shown in Figure 4, a sleeve 43 is rotatably mounted upon the drive shaft 37, within the collar 31, and operates between stop rings 44, clamped to the drive shaft. This shifting sleeve is provided upon one side with rack teeth 45, in permanent mesh with the teeth of the pinion 36. It is thus seen that the shifting sleeve 43 does not rotate with the drive shaft, but upon turning the hand wheel 35, this shifting sleeve will effect the longitudinal adjustment of the drive shaft.

The numeral 46 designates a guard, placed over the rotatable saw element 38. The bottom of this guard is open, and preferably straight and this bottom is adapted to engage with the veneer log. Preferably formed integral with the rear side of the guard are lugs 47, disposed upon opposite sides of the drive shaft, with the drive shaft extending through a vertical slot 48. These lugs have vertical openings formed therein, to slidably receive bolts 49, also passing through opening in lugs 50, preferably formed integral with the collar 31. Compressible coil springs 51 surround the bolts 49 and are arranged between the lugs 47 and 50. The lower ends of the bolts are screw-threaded for receiving adjustment nuts 52, arranged to contact with the lugs 47. The springs 51 serve to project the guard 46 downwardly, when released to completely cover the saw element, but when the guard is pressed into engagement with the veneer log it will move upwardly with relation to the collar 31, Figure 4, thereby exposing the lower portion of the saw. The extent of this upward relative movement of the guard is limited by the adjustment of the nuts 52, which in turn will regulate the depth of the groove. The guard 46 is provided in one side in the direction of rotation of the saw element 38 with slots covered by louvres 53, and these louvres are preferably covered by a cap 54, pivoted at 55 to the guard.

The operation of the motor is controlled by means of a switch 56 located upon the tubular housing 30, near its forward end.

A bar 57 is rigidly attached to the bed 22' and extends rearwardly beyond the same and carries weights 58, which are longitudinally adjustable thereon and adapted to be clamped in selected adjusted positions by bolts 59 or the like.

The operation of the machine is as follows:
The operation of the veneer lathe is first stopped and the log is accordingly brought to rest. The log is then carefully turned by hand, or power, until it is brought into position so that the rotatable saw element will cut the groove in the desired position. The operator then moves the open carriage 21 to the starting end of the frame 14, and then closes the switch 56, which starts the motor, which through the medium of the drive shaft 37, rotates the saw element 38. The hand wheel 35 is turned so that the shaft 37 is shifted to the outermost position. The operator then depresses the swinging unit including the housing 30, preferably by forcing the housing downwardly by engaging the hand wheel 35, thereby causing the guard 46 to contact with the log 11. The hand wheel 35 serves as means for shifting the drive shaft longitudinally and also has means whereby the operator standing upon the side of the log remote from the motor may depress the tubular housing. The guard will move upwardly with relation to the housing 30 and hence the saw will enter the log and cut the longitudinal groove. While the saw is thus engaging the groove, the operator pushes the pivoted unit toward the opposite end of the log. The saw thus cuts a groove in the log throughout the entire length of the log. The operator now releases the pivoted unit and the housing 30 and associated elements swing upwardly due to the action of the weights 58 which overbalance the forward end of the unit. If it is desired to cut a second groove in the log, the hand wheel 35 is turned in a direction to shift the drive shaft 37 rearwardly, and the swinging unit is again moved downwardly so that the guard 46 contacts with the log and is elevated thereby with relation to the saw, and the sawing operation is repeated. After the cutting of the second groove, the swinging unit is released and the forward end of the housing 30 will automatically rise. As soon as the housing begins to rise, the springs 51 force the guard 46 downwardly with relation to the saw element, to completely cover the same. The switch 56 may now be opened to stop the motor. Particular attention is called to the fact that when the swinging unit is shifted to the lowermost position, whereby the saw element engages the log, that the saw element is disposed obliquely with respect to the vertical and horizontal planes, and cuts the groove in the side of the log remote from the frame 14. This produces a groove which is disposed obliquely with respect to the vertical and horizontal which permits of the saw throwing saw dust from within the groove as the groove is being cut. The upward movement of the guard 46 with relation to the saw element is stopped when the springs 51 become closed, due to compression, and it is obvious that the closing of the springs is regulated by adjusting the nuts 52. Hence by adjusting the nuts 52, the extent of upward movement of the guard 46 may be regulated which in turn will regulate the depth of the groove.

It is to be understood that the form of my invention, herein shown and described, is to be taken as a preferred example of the same, and that various changes in the shape, size and arrangement of parts may be resorted to without departing from the spirit of my invention, or the scope of the subjoined claims.

Having thus described my invention, I claim:—

1. In a log grooving saw machine, a track arranged upon one side of the log held in a lathe and embodying spaced upper and lower rails, an open carriage, guide elements secured to the carriage to engage with the rails, the arrangement being such that the carriage is held against swinging movement and is free to move longitudinally, a bed extending transversely within the open carriage and provided at its sides with pivot elements extending longitudinally of the carriage, bearings secured to the sides of the carriage and receiving the pivot elements, the arrangement being such that the bed may swing in a substantially vertical plane at substantially a right angle to the direction of movement of the carriage a motor rigidly mounted upon the bed and having an armature shaft extending forwardly and transversely of the carriage, a tubular housing rigidly secured to the forward end of the bed and projecting forwardly beyond the same and spaced from the motor, a drive shaft slidably mounted within the tubular housing, a coupling effecting a slidable connection between the drive shaft and the armature shaft and arranged between the motor and the tubular housing, means to shift the drive shaft longitudinally, and a rotatable saw element mounted upon the drive shaft.

2. In a log grooving saw machine, a track, an upstanding traveling frame mounted upon the track to travel longitudinally of the same and held against turning movement upon the track, a bed arranged within the upstanding frame and extending transversely thereof, means pivotally connecting the sides of the bed with the sides of the upstanding frame so that the bed may swing in a substantially vertical plane at substantially a right angle to the direction of movement of the frame, a tubular housing extending transversely upon the forward side of the pivots of the bed and rigidly attached to said bed, a drive shaft within the tubular housing, a motor rigidly mounted upon the bed and connected with the rear end of the drive shaft, a rotatable saw element carried by the forward end of the drive shaft, and means to swing the tubular housing upwardly.

3. In a log grooving saw machine, a track, a carriage to travel longitudinally of the track, a support pivoted upon the carriage to swing in a direction at substantially a right angle to the direction of travel of the carriage, a tubular housing rigidly connected with the support and extending forwardly from the same, a drive shaft mounted within the tubular housing, means connected with the forward end of the tubular housing to shift the drive shaft longitudinally and also serving as means whereby the operator standing upon the side of the log remote from the motor may depress the tubular housing, a rotatable saw element connected with the forward end of the drive shaft, and a motor rigidly mounted upon the support and having a driving connection with the drive shaft.

4. The combination with the element of a lathe for holding a log horizontally and turning the same upon its longitudinal axis, of a pair of horizontally spaced rails disposed above the same, an upstanding traveling frame mounted to slide longitudinally of the rails and held against turning movement, a bed mounted within the frame and pivoted thereto to swing transversely of the same in a substantially vertical plane, a motor rigidly mounted upon the bed and having its armature shaft extending transversely of the frame, a tubular housing rigidly attached to the bed and extending at substantially a right angle to the carriage and projecting over and beyond the longitudinal axis of the log to be brought into proximity to the opposite side of the log remote from the carriage, a longitudinally movable drive shaft within the tubular carriage, a longitudinally adjustable driving connection between one end of the drive shaft and the armature shaft of the motor, a manually operated element secured to the outer end of the tubular housing and serving to longitudinally adjust the drive shaft and also being adapted to be engaged by the operator standing upon the side of the log remote from the carriage for depressing the tubular housing, a counter weight connected with the bed to automatically raise the free end of the housing when released, a saw element carried by the free end of the drive shaft, and a guard covering the saw element.

In testimony whereof I affix my signature.

STONEWALL J. GARDNER.